US012602533B2

(12) United States Patent
Shin

(10) Patent No.: US 12,602,533 B2
(45) Date of Patent: Apr. 14, 2026

(54) CONTENT GENERATION WITH INTEGRATED AUTOFORMATTING IN WORD PROCESSORS THAT DEPLOY LARGE LANGUAGE MODELS

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/351,974

(22) Filed: Jul. 13, 2023

(65) Prior Publication Data

US 2025/0021739 A1 Jan. 16, 2025

(51) Int. Cl.
*G06F 40/103* (2020.01)
*G06F 16/3329* (2025.01)
*G06F 40/166* (2020.01)
*G06F 40/284* (2020.01)

(52) U.S. Cl.
CPC ........ *G06F 40/103* (2020.01); *G06F 16/3329* (2019.01); *G06F 40/166* (2020.01); *G06F 40/284* (2020.01)

(58) Field of Classification Search
CPC .. G06F 40/103; G06F 16/3329; G06F 40/166; G06F 40/284
See application file for complete search history.

(56) References Cited

U.S. PATENT DOCUMENTS 9,208,232 B1 12/2015 Tirumalareddy et al.
12,038,958 B1 * 7/2024 Soubbotin ............. G06F 16/335
2011/0137886 A1 6/2011 Wen et al.
2013/0339846 A1 12/2013 Buscemi
2016/0132291 A1 * 5/2016 Bai ......................... G10L 15/22 715/728
2018/0107636 A1 4/2018 Huang et al.
2018/0341630 A1 11/2018 DeVries
2024/0273411 A1 * 8/2024 Mueck .................. H04L 9/3263
2024/0296279 A1 * 9/2024 Gardner .............. G06F 16/3329
2024/0419465 A1 * 12/2024 Riscutia ................ G06F 40/166

OTHER PUBLICATIONS

"A Large Language Model (LLM) Based Document Auto-Completion Optimized for Indent-Paragraph Fitting for Increased Readability" GP-305905-00-US_IDF 313858 _SR-4973 Search Report Apr. 18, 2023, 34 pages.

* cited by examiner

*Primary Examiner* — Andrey Belousov
(74) *Attorney, Agent, or Firm* — Lowenstein Sandler LLP

(57) ABSTRACT

Techniques and systems are disclosed that perform content generation with integrated automated formatting using word processing applications that deploy large language models (LLMs). The techniques include receiving, a natural language (NL) query for a synthetic content for a document, identifying formatting rules of the document, and generating an augmented query that includes a representation of at least a portion of the NL query and a representation of the one or more formatting rules of the document. The techniques further include providing the augmented query to an LLM and updating the document with the synthetic content generated by the LLM in response to the augmented query.

20 Claims, 6 Drawing Sheets

300

To: James Jones, President of Abigail Smith Foundation

We truly can't thank you enough for your generous and continued donations to the Appalachian Music School that you have made in the previous years. Your donations are a wonderful gift to many of our students from low-income families who received scholarships from the Abigail Smith Foundation. Without these scholarships, many of the recipients would not be able to study music, their true passion in life.

302

[Finish the letter. Invite Jim to our Autumn festival concert and explain we need to replace 6 acoustic and 2 electronic pianos. Limit to 6-7 additional lines]

304

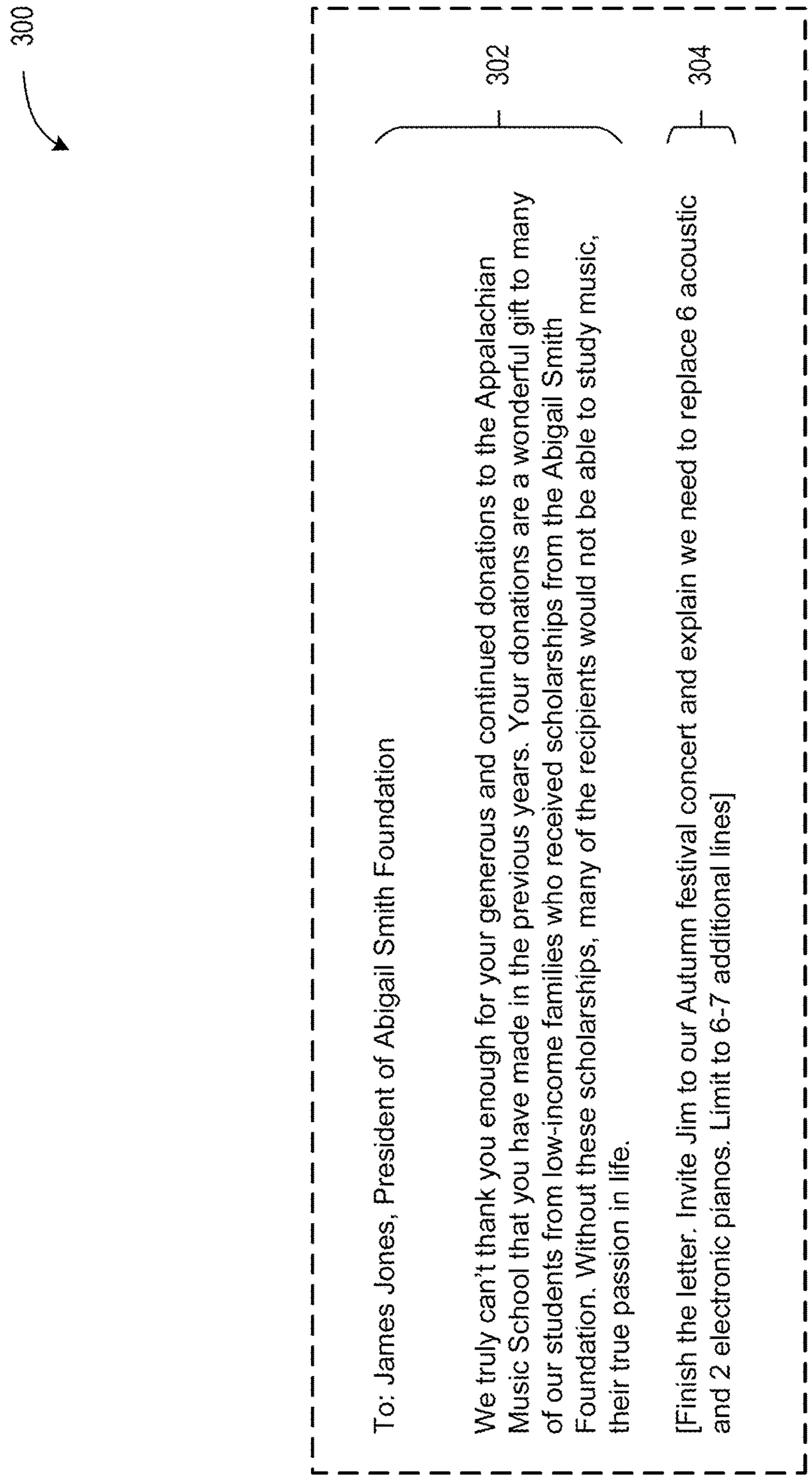

FIG. 3A

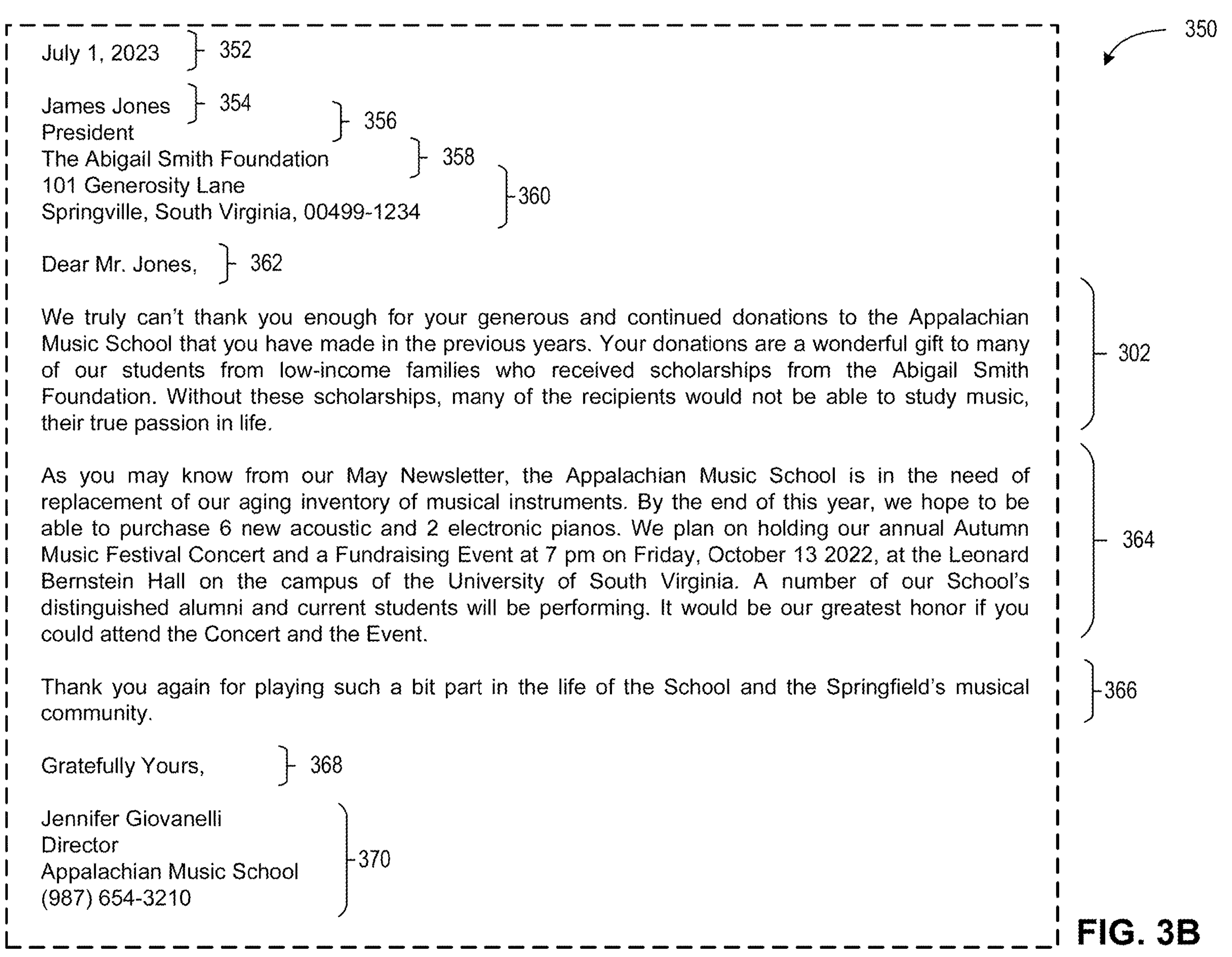

July 1, 2023

James Jones
President
The Abigail Smith Foundation
101 Generosity Lane
Springville, South Virginia, 00499-1234

Dear Mr. Jones,

We truly can't thank you enough for your generous and continued donations to the Appalachian Music School that you have made in the previous years. Your donations are a wonderful gift to many of our students from low-income families who received scholarships from the Abigail Smith Foundation. Without these scholarships, many of the recipients would not be able to study music, their true passion in life.

As you may know from our May Newsletter, the Appalachian Music School is in the need of replacement of our aging inventory of musical instruments. By the end of this year, we hope to be able to purchase 6 new acoustic and 2 electronic pianos. We plan on holding our annual Autumn Music Festival Concert and a Fundraising Event at 7 pm on Friday, October 13 2022, at the Leonard Bernstein Hall on the campus of the University of South Virginia. A number of our School's distinguished alumni and current students will be performing. It would be our greatest honor if you could attend the Concert and the Event.

Thank you again for playing such a bit part in the life of the School and the Springfield's musical community.

Gratefully Yours,

Jennifer Giovanelli
Director
Appalachian Music School
(987) 654-3210

Receive a natural language (NL) query for a synthetic content for a document 410

Identify one or more formatting rules of the document 420

Parse the NL query and/or stored configuration file for the document 422

Generate an augmented query with a representation of the NL query and formatting rule(s) of the document) 430

Provide a preview of the augmented query to a user session associated with the NL query 432

Receive an updated augmented query from the user session 434

Provide the augmented query to a large language model (LLM) 440

Update the document with the synthetic content generated by the LLM in response to the augmented query 450

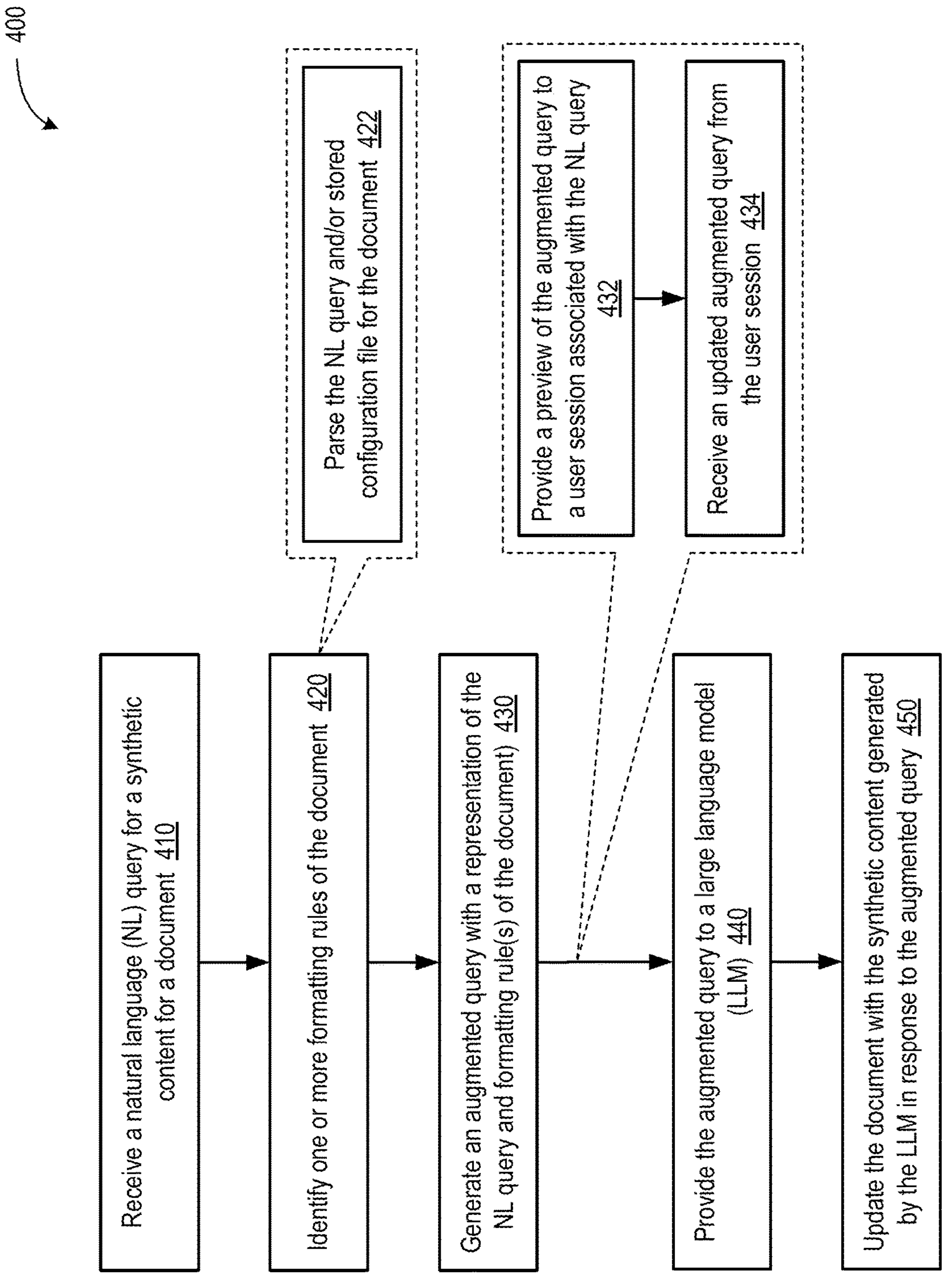

FIG. 4

CONTENT GENERATION WITH INTEGRATED AUTOFORMATTING IN WORD PROCESSORS THAT DEPLOY LARGE LANGUAGE MODELS

TECHNICAL FIELD

Implementations of the present disclosure relate to computing systems, and more specifically, to methods and systems that integrate artificial intelligence functionality with other computer technologies.

BACKGROUND

Generative artificial intelligence (AI) models, as connoted by the name, are capable of generating (inferring) data based on inputs (prompts) that specify a scope of the data generating tasks. Large language models (LLMs) represent a category of LLMs that are trained to capture syntax and semantics of human language, e.g., by predicting a next (and/or a previous) word in a sequence of words (e.g., one or more sentences of a human speech or text) and then further trained using training data containing a large number of texts, such as human dialogues. A trained LLM is capable of carrying out a conversation with a user in natural language in a manner that closely resembles a dialogue with a human speaker, including understanding the user's intent and responding in ways that the user expects from a conversational partner. LLMs are typically implemented using neural networks with a large number (billions) of artificial neurons, e.g., deep learning neural networks with a self-attention mechanism (such as transformer neural networks). LLMs are used for customer service interactions, responding to information requests, travel itinerary planning, generating documents, content, and various other tasks. LLMs find uses in many fields, including health care, education, entertainment industry, finance services, e-commerce, news, productivity, and/or the like.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The subject matter of the disclosure relates to integration of a word processor application with large language models for efficient text generation with correct formatting. According to one aspect of the present disclosure there is provided a method that includes receiving, by a processing device, a natural language (NL) query for a synthetic content for a document and identifying, by the processing device, one or more formatting rules of the document. The method further includes generating, by the processing device, an augmented query that includes a representation of at least a portion of the NL query and a representation of the one or more formatting rules of the document. The method further includes providing the augmented query to a large language model (LLM), and updating, by the processing device, the document with the synthetic content generated by the LLM in response to the augmented query.

According to another aspect of the present disclosure there is provided a system that includes one or more devices, the one or more devices configured to carry out the method described herein. The system may include a memory device and a processing device communicatively coupled to the memory device, the processing device performing various actions of "receiving," "generating," "providing," and "updating."

According to another aspect of the present disclosure there is provided a non-transitory computer-readable medium to store instructions, which when executed by a processing device, cause the processing device to carry out the method described herein above.

BRIEF DESCRIPTION OF THE DRAWINGS

The disclosure is illustrated by way of example, and not by way of limitation, and can be more fully understood with references to the following detailed description when considered in connection with the figures, in which:

FIG. 3A illustrates an example user-generated query that may be processed in accordance with one or more implementations of the present disclosure.

FIG. 3B illustrates an example output by a large language model generated in response to a user-generated query of FIG. 3A, in accordance with one or more implementations of the present disclosure.

FIG. 4 is a flow diagram of an example method of content generation with integrated automated formatting using a word processing application that deploys a large language model, in accordance with one or more implementations of the present disclosure.

DETAILED DESCRIPTION

Figure 1:
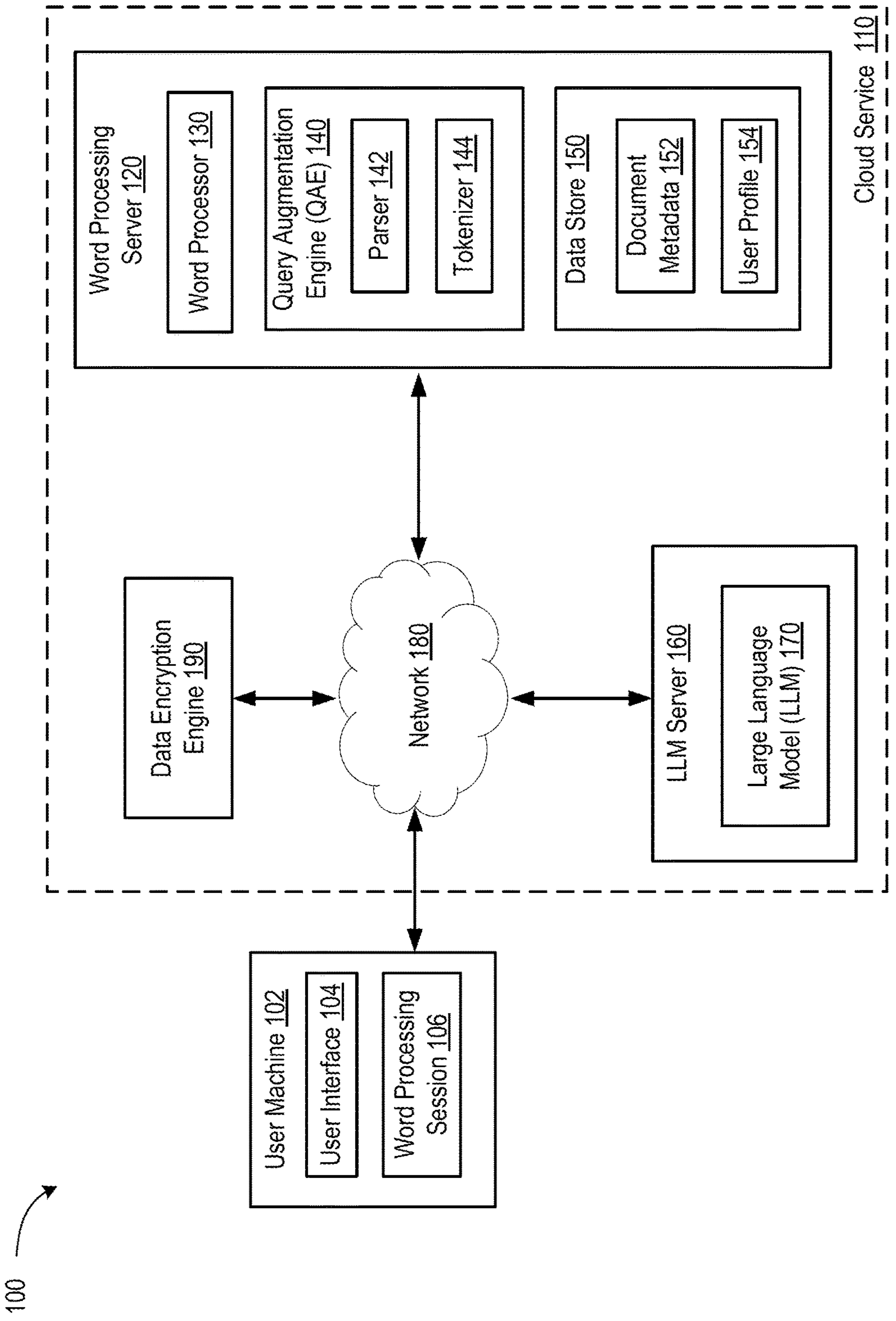
FIG. 1 illustrates an example system architecture capable of automated content formatting in word processing applications integrated with large language models, in accordance with one or more aspects of the present disclosure.

LLMs are currently being integrated into various other computing applications to achieve new functionality. In particular, integration of LLMs with various word processing applications, email applications, productivity suites, and/or the like, facilitates efficient creation, modification, and collaborative sharing of documents, which may include texts, images, animations, and/or various additional contents. For example, shaping an idea into a well-formed and articulated text may take considerable time and editing effort. Integration of LLMs can improve creator productivity with LLM-provided suggestions to the document creator. More specifically, the creator may request assistance from an LLM integrated into (or communicating with) a word processor by formulating a natural language query that identifies content to be included in the document. The query can be composed quickly and need not be artfully worded since the LLM is capable of parsing the query and identifying a request for the target content that is to be generated. LLM may then generate a target content (inferred from the query)

and present this content to the user (e.g., document creator, collaborator, etc.). The target content (e.g., text) may have proper composition, semantic associations, logical connections, syntaxis, and/or other attributes of a well-drafted document. In some instances, the user may include one or more seed (sample) paragraphs to provide to the LLM with a writing style that the LLM is to emulate. The LLM, operating in an auto-completion mode, may then generate additional paragraphs that present the target content using the writing style learned from the seed paragraph(s).

Modern LLMs have achieved a remarkable level of sophistication in parsing a target content and transforming it into a synthetic text that emulates the user's writing style. However, the existing LLM frameworks are not fully integrated into word processing applications. More specifically, the existing LLMs do not naturally capture various metadata that determines how the generated text is to be displayed within the document. For example, such visual formatting may include page layout rules, page breaks, individual paragraph indentation rules, line breaks, length of paragraphs, limits on a number of pages, and/or any other formatting rules that determine how generated text is displayed with the document, for improving appearance of the document and, through the visual aesthetics, readability of the document. In more advanced cases, visual content integration rules may include metadata (e.g., as part of a document configuration file or profile file that defines how visual content (e.g., pictures, graphs, drawings, animations, references, and/or the like) is displayed within the document, e.g., whether the text wraps around a picture or a picture is centered in the text with the text displayed above and below the picture (with no text displayed at the same level with the picture), whether the picture is to be displayed at the top (or bottom) of a page, and/or the like. As a result, modern LLM integration with word processors still leaves much formatting work to a user. Accordingly, the user may need not only to edit and fine-tune the generated synthetic text but may also have to adjust its formatting at the same time. Since sub-optimal formatting decreases text readability and changes reader's perception of the text, editing/fine-tuning may be hindered by lack of formatting (or incorrect formatting), which leads to reduced efficiency of user's work and, potentially, multiple requests to the LLM to change the content. This makes user's work harder and longer while also consuming processing resources (e.g., a number of compute cycles and memory usage) required to support word processor/LLM deployment.

Aspects and implementations of the instant disclosure address the above-mentioned and other challenges of the existing technology by providing for systems and techniques capable of efficiently identifying formatting constraints and incorporating such constraints into a content generation process. A query augmentation module or engine may facilitate integration of a word processor application with text generation functionality provided by an LLM to ensure that LLM-generated texts are integrated into word processor documents with correct formatting. In some implementations, a query augmentation engine may include an application programming interface (API) that identifies formatting information and communicates the formatting information to the LLM. More specifically, the query augmentation engine may access a document configuration file that includes various document formatting rules, including formatting of fonts, lines, line breaks, paragraphs, pages, equations, images, tables, references, images, animations, and/or any other suitable document elements. The query augmentation engine may parse the user-generated query (a natural language request for a new content) and identify those document formatting rules that are relevant for the query. The relevant document formatting rules may be identified in the query implicitly or explicitly. For example, implicitly identified rules may be associated with a type of a product that is being requested by the user, e.g., text, images, references, and/or the like. In such instances, the query augmentation engine may access, in the document configuration file, line/paragraph/page formatting rules, rules that specify how images/animation/references/etc. are embedded in the document, and/or the like. Explicitly identified rules may be specific requests submitted as part of the user-generated query, e.g., requests for a specific number of paragraphs, pages, figures, and/or the like. The document formatting rules identified as being relevant (implicitly and explicitly) for the document may be added to the user-generated query and used as an input into the LLM. In some implementations, the document formatting rules may be added in a natural language form. In some implementations, to reduce a computational load of preprocessing natural language queries (e.g., tokenization of words of the query via numerical tokens/embeddings), the query augmentation engine may proactively encode the added document formatting rules via tokens, e.g., based on a corpus of tokens stored in conjunction with the word processor.

Having received the user-generated query together with the document formatting rules added by the query augmentation engine, the LLM may generate a response with a content that comports to the provided document formatting rules. In some implementations, the content may include text(s) generated by the LLM, images and/or references retrieved by the LLM (e.g., from the Internet and/or any database accessed by the LLM), and/or any other content. The produced content may be integrated into the document in a form that requires little or no editing by the user.

The advantages of the disclosed techniques include but are not limited to quick and automated identification of document formatting rules and a seamless integration of LLM-generated content into documents that are being created using word processing applications. This allows the document creator to focus more attention on the substance and meaning of the generated content—with the content presented in a highly readable form—and less attention on fixing formatting inconsistencies. This improves creator's productivity, enjoyment, and satisfaction with the document creation process.

FIG. 1 illustrates an example system architecture 100 capable of automated content formatting in word processing applications integrated with large language models, in accordance with one or more aspects of the present disclosure. The system architecture 100 (also referred to as "system" herein) may include a user machine 102 and a cloud service 110. Cloud service 110 may provide a word processing application to a user of user machine 102. Although a single user machine 102 is illustrated in FIG. 1, cloud service 110 may support any number of user machines, each user machine supporting any number of users. Cloud service 110 may include a word processing server 120 that provides a word processing application, referred to as word processor 130 herein, to one or more user machines 102. Cloud service 110 may deploy an LLM server 160 supporting operations of an LLM 170. Cloud service 110 may integrate functionality provided by word processor 130 with functionality of LLM 170. Connection of user machine 102 to various servers of cloud service 110, e.g., word processing server 120 and LLM server 160 may be facilitated by a network 180. In some implementations, network 180 may be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long-Term Evolution (LTE) network), and/or the like. In some implementations, network 180 may include routers, hubs, switches, server computers, and/or a combination thereof.

In some implementations, any of user machine 102, word processing server 120, and/or LLM server 160 may include a desktop computer, a laptop computer, a smartphone, a tablet computer, a server, a scanner, or any suitable computing device capable of performing the techniques described herein. In some implementations, any of user machine 102, word processing server 120, and/or LLM server 160 may be (and/or include) one or more computer systems 500 of FIG. 5.

Integration of LLM 170 with word processor 130 may be facilitated by a query augmentation engine (QAE) 140 whose operations are disclosed in more details in conjunction with FIG. 2 below. QAE 140 may operate as a front end for receiving user queries from user machine 102. User queries may be submitted via user interface 104, e.g., as part of authenticated word processing session 106 established for a user. User queries can be requests for any content to be placed in any suitable document being prepared (initially created or modified) and may include queries for text content or a combination of text content and any other content, such as graphics, animations, references, hypertext links, tables, and/or the like. QAE may include a parser 142 for parsing the user-generated queries for explicit user-specified instructions about document formatting. Parser 142 may also extract various implicit document formatting rules, e.g., as specified in document metadata 152 stored in a data store 150 of word processing server 120. Document metadata 152 may include various default constraints established by word processor 130 (e.g., for various specific document types and/or templates) and/or any user-specific preferences, which may be established during the current and/or previous user sessions of a particular user on word processor 130. The user preferences may be stored as part of user profile 154, which may be indexed by user identification (user ID).

Data store 150 may be implemented in a persistent storage capable of storing files as well as data structures to perform identification of data, in accordance with implementations of the present disclosure. Data store 150 may be hosted by one or more storage devices, such as main memory, magnetic or optical storage disks, tapes, or hard drives, network-attached storage (NAS), storage area network (SAN), and so forth. Although depicted as part of word processing server 120, data store 150 may be implemented on a computing device that is separate from the word processing server 120. In some implementations, data store 150 may be implemented on a network-attached file server, an object-oriented database, a relational database, and so forth, that may be hosted by word processing server 120 or a separate computing device coupled to word processing server 120 via network 180.

QAE 140 may be configured to parse various explicit and/or implicit document formatting constraints and generate one or more auxiliary queries that supplement user-generated queries with specific instructions for the requested (target) content, including layout rules, individual paragraph indentation rules, rules for line breaks, page breaks, length of paragraphs, limits on a number of pages, graphics embedding rules, references rules, table embedding rules, and/or the like. In some implementations, QAE may use a tokenizer 144 to encode the auxiliary queries in a form of digital representation (embeddings) that can be understood by LLM 170.

System 100 may further include a data encryption engine 190 to encrypt communications between user machine 102 and cloud service 110, including but not limited to contents of documents created by user, user-generated queries for target content received by cloud service 110, and/or various content generated by LLM 170 and provided to user machine 102 in response to the user-generated queries. Data encryption engine may also encrypt auxiliary queries generated by QAE 140.

Although queries generated by a single user are typically referenced throughout this disclosure, similar techniques may be used to support collaborative document/content creation, where multiple users create or edit (e.g., using the same user machine 102 or different user machines) the same document, concurrently or at different times. In such instances, QAE 140 may use the document metadata for the document and also access preferences stored as part of user profiles 154 of multiple users, which may include preferences of a specific user submitting a given query as well as other users who may be registered as owners and/or creators of the document.

QAE 140 may include (or may have access to) instructions stored on one or more tangible, machine-readable storage media of word processing server 120 and executable by one or more processing devices of word processing server 120, which may include one or more central processing units (CPUs), graphics processing units (GPUs), data processing units (DPUs), parallel processing units (PPUs), application-specific integrated circuits (ASICs), field-programmable gate arrays (FPGA), and/or any combination thereof. In one implementation, QAE 140 may be implemented on a single server (e.g., as depicted in FIG. 1). In some implementations, QAE 140 may be a combination of a client component and a server component. In some implementations QAE 140 may be executed entirely on the user machine(s) 102. Alternatively, some portion of QAE 140 may be executed on a user machine 102 while another portion of QAE 140 may be executed on word processing server 120.

In situations in which the systems discussed here collect personal information about users, or may make use of personal information, the users may be provided with an opportunity to control whether word processor server 120 collects user information. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Figure 2:
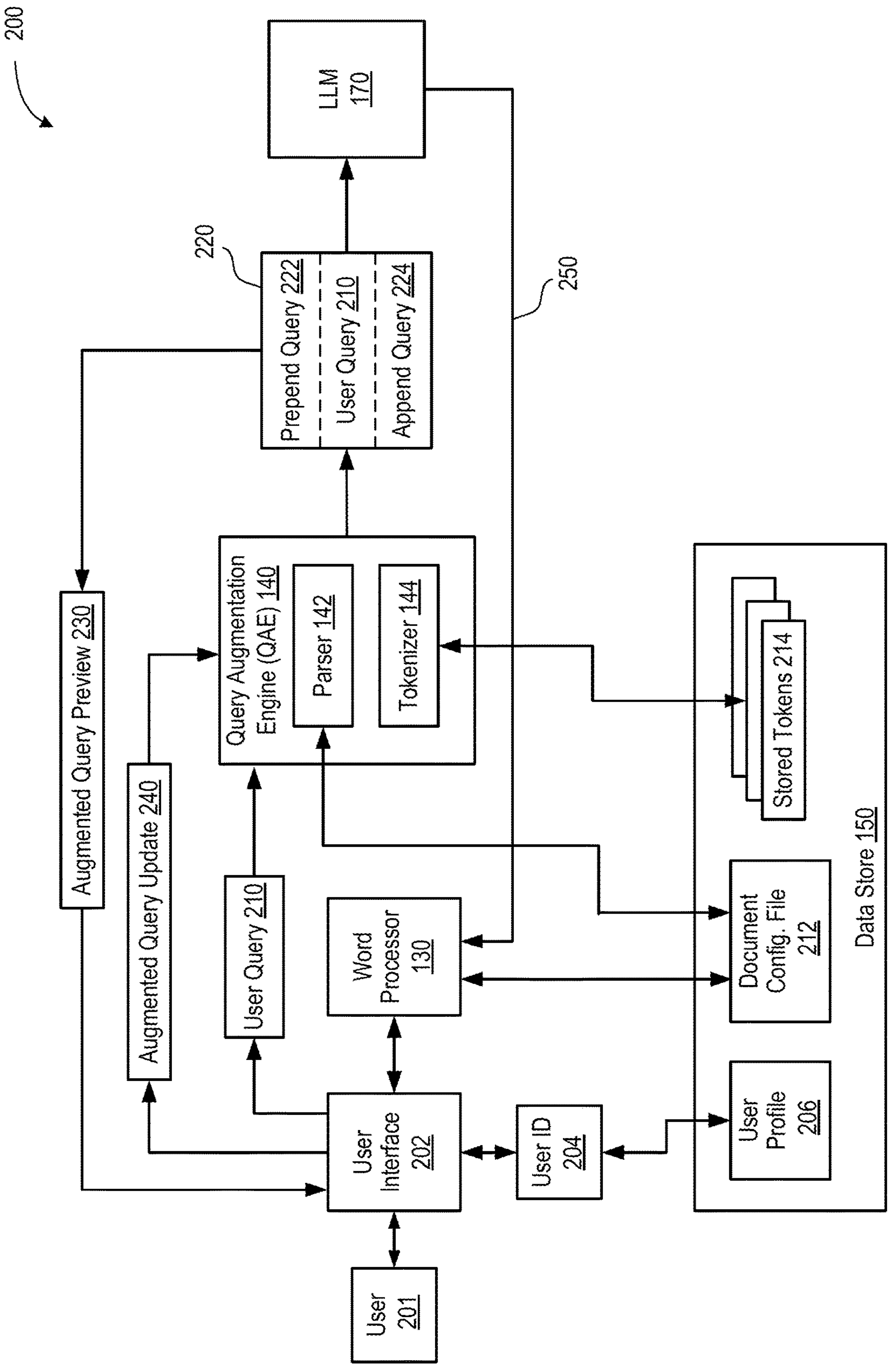
FIG. 2 illustrates an example workflow of content generation in word processing applications that use large language models with integrated automated formatting, in accordance with one or more implementations of the present disclosure.

FIG. 2 illustrates an example workflow 200 of content generation in word processing applications that use large language models with integrated automated formatting, in accordance with one or more implementations of the present disclosure. A user 201 may use word processor 130 with user's access to word processor 130 facilitated via a user interface 202. User interface 202 should be understood as any combination of hardware devices, such as a display, touchscreen, keyboard, pointing device, speaker(s), microphone(s), camera(s), etc., and software programs, such as a general-purpose browser, a dedicated special-purpose application, and/or the like. User interface 202 may be integrated with an authentication/encryption module (not shown in FIG. 2). For example, the authentication/encryption module may authenticate access of user 201 to word processor 130 and to files and data accessible to user 201 (including files and data previously created by user 201 or a group with which user 201 affiliates). Authentication may be performed using any known techniques of authentication, including password authentication, two-step authentication, biometric authentication, and/or the like. The authentication/encryption module may also be used to encrypt two-way data communications between user interface 202 and word processor 130. Data communication may be encrypted with any suitable encryption techniques (e.g., private/public key encryption, symmetric key encryption, digital signature algorithms, and/or the like) using cryptographic information (e.g., one or more encryption key is) that is specific to user identification (user ID) 204 of user 201. Additionally, user interface 202 may be used to obtain an informed consent from user 201 to process user's data using LLM 170, e.g., in the instances where LLM 170 is under control of a third party or where LLM 170 uses third party information and/or resources data for query processing. A separate informed consent may be obtained from user 202 to store user's documents and user's document formatting preferences, for future uses.

Example workflow 200 may include receiving a user query 210 from user 201 (e.g., via user interface 202) for processing by LLM 170. User query 210 may be a request for any type of content that is to be added to a file/document that user 201 is creating and/or modifying. The content may be textual, hypertextual, graphical, mathematical (formulaic), media (e.g., audio and/or video) content, and/or the like, or any combination thereof. Rather than providing user query 210 directly to LLM 170, user query 210 may be received by QAE 140 for preprocessing. In some implementations, QAE 140 may include one or more APIs to facilitate integration of QAE 140 with various other components and modules. For example, QAE 140 may deploy an API that facilitates interactions with word processor 130 and/or data store 150. QAE 140 may further deploy an API that facilitates interactions with LLM 170.

QAE 140 may receive user query 210 (e.g., via the corresponding API) with a content creation task that user 201 is asking LLM 170 to perform. FIG. 3A illustrates an example user-generated query 300 that may be processed in accordance with one or more implementations of the present disclosure. Query 300 may include a seed paragraph 302 that user 201 intends to present to LLM 170. Seed paragraph 302 may serve as a sample of the user's writing style and may also provide a context in which LLM 170 is to generate the requested content. For example, seed paragraph 302 of query 300 provides a context of previous donations that Mr. Jones made to the Appalachian Music School. Query 300 further includes a prompt 304 that requests LLM 170 to complete the letter and invite Mr. Jones to a concert and a fundraising event while also informing Mr. Jones that the School needs to replace some of its musical instruments. The prompt 304 describes some of the target format of the letter (limiting the letter to 6-7 lines) but does not specify further document formatting.

Referring again to FIG. 2, having received query 210 (e.g., example query 300), QAE 140 may access a document configuration file 212 that includes various document formatting rules, including formatting of fonts, lines, line breaks, paragraphs, pages, equations, images, tables, references, images, animations, and/or any other suitable document elements. In some implementations, document configuration file 212 may include one or more JSON objects (files). Document formatting rules may be specified for the type of the document being created (e.g., letter, in the example of FIG. 3A) and may be default formatting rules, e.g., as set by word processor 130. In some instances, document formatting rules may be modified by user 201 from their default values and stored as part of user profile 216. Parser 142 may identify explicit and implicit document formatting rules, as may be pertinent to user query 210. In the example of FIG. 3A, explicit rules include the instruction (e.g., submitted with seed paragraph 302) to limit the additional text to 6-7 lines. Parser 142 may identify (e.g., using one or more keyword searches, Boolean searches, and/or the like) such explicit document formatting rules and select these rules for an augmented query. Additionally, parser 142 may parse document configuration file 212 (and or user profile 216) for any implicit document formatting rules. For example, parser 142 may identify that the letter to Mr. Jones has to include the following information: date, name/address of an organization represented by Mr. Jones, salutation (e.g., "Dear Mr. Jones"), one or more paragraphs, an appreciation statement ("Thank you . . . "), a formal sign-off (e.g., "Sincerely . . . "), a name/address of the sender, no indentation, and line breaks between the above items separated. Parser 142 may further determine that paragraphs in the body of the letter are to be justified (even though the seed paragraph 302 is aligned on the left edge). Parser 142 may provide this (and various additional) information to QAE 140. QAE 140 may access additional documents, e.g., based on a keyword search performed by parser 142. For example, having identified that the recipient of the letter is Mr. Jones, parser 142 may locate one or more other recent letters addressed to Mr. Jones and retrieve a full name, title, organization, and address of Mr. Jones. Similarly, having encountered a reference to the May Newsletter, parser 142 may access the May Newsletter to determine the exact time and venue of the Autumn concert.

QAE 140 may add various document formatting rules to user query 210 to generate an augmented query 220. In some implementations, the document formatting rules may be added in a natural language form. In some implementations, the document formatting rules may be added in a digital form of tokens (embeddings). Tokens refer to numerical representations of various words and phrases that can be input into LLM 170. Tokens may be generated using tokenizer 144, which may include Word2vec algorithm, Byte Pair algorithm, WordPiece algorithm, or any other tokenization algorithm that is used by LLM 170 to represent natural language inputs. In some implementations, tokens for various (e.g., common or previously encountered) formatting instructions may be stored in data store 150, e.g., as part of stored tokens 214. Stored tokens 214 may be retrieved by QAE 140 and used in augmented queries 220. Formatting rules and instructions that have not been previously encountered may be tokenized by tokenizer 144 and then stored in stored tokens 214, for future uses. Stored tokens 214 may include shared tokens and private tokens. Shared tokens do not contain any private data and may encode typical instructions used by multiple users, e.g., "limit to n paragraphs/pages," "justify paragraphs," "do not justify paragraphs," "indentation with line breaks," "no indentation with line breaks." "indentation with no line breaks," and/or the like. Private tokens may include private data, e.g., name/address of creator (user 201) or contacts of the creator, personal data of the creator, and/or the like.

Augmented query 220 may include user query 210 and one or more added formatting queries with the identified (implicit and/or explicit) formatting rules for the document being created. FIG. 2 illustrates a formatting query that precedes user query 210, herein referred to as prepend query 222, and a formatting query that follows user query, herein referred to as append query 224. Any document formatting instructions may be added as part of prepend query 222 or as part of append query 224. In some implementations, only one of prepend query 222 or append query 224 may be used. In some implementations, prepend query 222 may include general formatting instructions (e.g., "limit to n paragraphs") and append query 224 may include more specific instruction (e.g., "no indentation," "1.5 line spacing," etc.).

As an example, augmented query 220 produced based on user-generated example query 300 may include instructions to include a date, a full name, title, affiliation and address of the recipient, salutation, the seed paragraph, a limitation of the body of the letter to 6-7 lines, an appreciation statement, a formal sign-off, a name/address of the sender, absence of paragraph indentation, and single line spacings between the lines.

In some implementations, prior to providing augmented query 220 to LLM 170, augmented query 220 may be presented to user 201, via user interface 202, as part of augmented query preview 230. Augmented query preview 230 may be in the natural language format that can be comprehended by user 201. User 201 may approve query 220 or change any part(s) of query 220 (e.g., of the original query 210, prepend query 222, and/or append query 224). User interface 202 may register changes to query 220 made by user 201 and send an augmented query update 240 to QAE 140. QAE 140 may tokenize the part(s) of the updated query 220 and provide the update query 220 as part of input into LLM 170. In some implementations, QAE 140 may similarly tokenize the original query 210, to ensure a uniformity of inputs into LLM 170.

Having received the augmented query 220 (which may include user updates), LLM 170 may generate output 250, which may include content created by LLM 170 together with any seed content from the original user-generated query. LLM 170 may have been trained on a large amount of data, including prediction of one or more missing words in a sentence, identification of whether two consecutive sentences are logically related to each other, generation of new texts based on prompts, and/or other techniques of training generative LLMs. As a result, LLM 170 may be capable of generating the content that auxiliary query 220 is requesting LLM 170 to produce. The content may include text(s) generated by the LLM, hypertext links, references, images/plots/videos, and/or any other content produced and/or retrieved by LLM 170 (e.g., from Internet and/or any database accessible by LLM 170), or some combination thereof. The output 250 content may include a document or a portion of a document with a content having in a form that requires little or no editing by user 201.

FIG. 3B illustrates an example output 350 by a large language model generated in response to user-generated query 300 of FIG. 3A, in accordance with one or more implementations of the present disclosure. Output 350 includes date 352, full name 354, title 356, affiliation 358, address 360 of the recipient, salutation 362, the seed paragraph 302, a substantive paragraph 364 limited to 7 lines, an appreciation statement 366, a formal sign-off 368, and a name/address 370 of the sender. Output 350 is formatted according to the formatting instructions submitted with auxiliary query 220, including line spacings, absence of indentation, and single line spacings between the lines. Output 350 may then be provided to user 201, via user interface, for approval and/or further editing (which may include additional queries to LLM 170).

FIG. 4 is a flow diagram of an example method 400 of content generation with integrated automated formatting using a word processing application that deploys a large language model, in accordance with one or more implementations of the present disclosure. A processing device, having one or more processing units (e.g., CPUs, GPUs, DPUs, and or the like) and memory devices communicatively coupled to the processing units may perform method 400 and/or each of its individual functions, routines, subroutines, or operations. The processing device executing method 400 may be a processing device of user machine 102, word processing server 120, and/or LLM server 160 of FIG. 1. In some implementations, the processing device executing method 400 may perform instructions issued by QAE 140. In certain implementations, a single processing thread may perform method 400. Alternatively, two or more processing threads may perform method 400, each thread executing one or more individual functions, routines, subroutines, or operations of the methods. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Various operations of method 400 may be performed in a different order compared with the order shown in FIG. 4. Some operations of method 400 may be performed concurrently with other operations. Some operations may be optional.

Method 400 may be implemented to support document creation by a user of a word processing application. In some implementations, document creation may be supported by a cloud-based word processing application and the document may be stored on cloud. In some implementations, document creation may be supported by a cloud-based word processing application and the document may be stored on a local machine. In some implementations, document creation may be supported by a local word processing application instantiated on the local machine (e.g., user machine 102, see FIG. 1). At block 410, method 400 may include receiving, by a processing device, a natural language (NL) query for a synthetic content for a document. In some implementations, the NL query for the synthetic content may include a seed content (e.g., one or more seed sentences, paragraphs, and so on). In some implementations, the NL query may include an explicit or implicit request to auto-complete at least a portion of the document.

At block 420, method 400 may continue with the processing device identifying one or more formatting rules of the document. The one or more formatting rules of the document may include some of the following: in indentation rule, a line spacing rule, a text alignment rule (e.g., left-align, right-align, justify, etc.), a graphics placement rule, a table placement rule, a reference formatting rule, or one or more document template rules, and/or the like.

As illustrated with the callout block 422, identifying the one or more formatting rules of the document may include parsing, for the one or more formatting rules, the NL query and/or a stored configuration file for the document. For example, the stored configuration file for the document may include one or more default formatting rules for a document type associated with the document. The stored configuration file may also store one or more formatting rules associated with a user identification (ID) of a user session associated with the NL query.

At block 430, method 400 may include generating, by the processing device, an augmented query. The augmented query may include a representation of the one or more formatting rules of the document. In some implementations, the representation of the one or more formatting rules of the document may include a natural language description of the one or more formatting rules of the document. In some implementations, the representation of the one or more formatting rules of the document may include a first tokenized representation of the one or more formatting rules of the document. The first tokenized representation may be generated using a tokenizing algorithm associated with the LLM. In some implementations, the first tokenized (embeddings) representation of the one or more formatting rules of the document may include one or more previously stored tokens, e.g., tokens of common formatting setups, tokens of previously used formatting rules, and/or the like.

In some implementations, the augmented query may also include a representation of at least a portion of the NL query. For example, the representation of at least a portion of the NL query may include a second tokenized representation of the portion of the NL query. As a result, the entire augmented query may be tokenized, with the first representation tokenizing the formatting rules and the second representation tokenizing the original user's NL query (or at least a portion of the NL query).

In some implementations, as illustrated with the bottom callout portion in FIG. 4, method 400 may include, at block 432, providing a preview of the augmented query to a user session associated with the NL query, and, at block 434, receiving an updated augmented query from the user session.

At block 440, method 400 may continue with providing the augmented query to a large language model (LLM). At block 450, the processing device performing method 400 may include updating the document with the synthetic content generated by (and received from) the LLM in response to the augmented query.

In some implementations, various communications between the user machine, word processing server, and/or LLM server may be encrypted. In particular, the NL query, the augmented query, and/or the synthetic content generated by the LLM may be encrypted.

Figure 5:
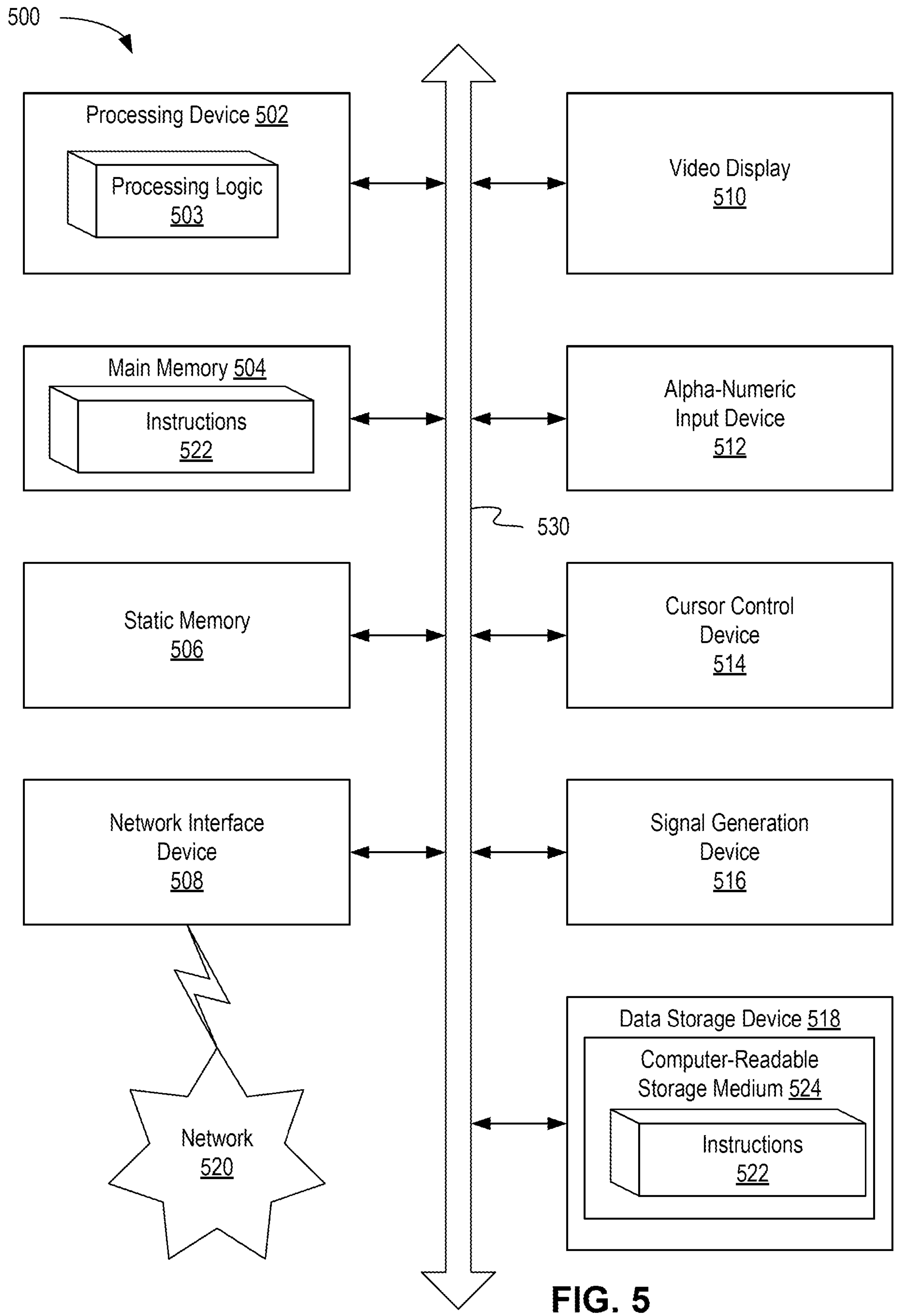
FIG. 5 depicts an example computer system that can perform any one or more of the methods described herein, in accordance with some implementations of the present disclosure.

FIG. 5 depicts an example computer system 500 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The example computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 (which can include processing logic 503) represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for implementing method 400 of content generation with integrated automated formatting using a word processing application that deploys a large language model.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one illustrative example, the video display unit 510, the alphanumeric input device 512, and the cursor control device 514 may be combined into a single component or device (e.g., an LCD touch screen).

The data storage device 518 may include a computer-readable storage medium 524 on which is stored the instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable media. In some implementations, the instructions 522 may further be transmitted or received over a network 520 via the network interface device 508.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:

receiving, by a processing device, a natural language (NL) query for a synthetic content for a document displayed in a user interface of a word processing application, the document associated with metadata identifying formatting rules associated with the displayed document;

processing the NL query to identify one or more formatting rules pertinent to the NL query;

accessing, by the processing device, the metadata to select, from the formatting rules associated with the displayed document, the one or more formatting rules pertinent to the NL query;

generating, by the processing device, an augmented query that comprises:

a representation of at least a portion of the NL query, and a representation of the one or more selected formatting rules;

providing the augmented query to a large language model (LLM); and updating, by the processing device, the displayed document with the synthetic content generated by the LLM in response to the augmented query.

2. The method of claim 1, wherein the NL query for the synthetic content comprises a seed content, and wherein the NL query comprises a request to auto-complete at least a portion of the displayed document.

3. The method of claim 1, wherein the one or more formatting rules of the displayed document comprise one or more of:

an indentation rule, a line spacing rule, a text alignment rule, a graphics placement rule, or a table placement rule.

4. The method of claim 1, wherein the formatting rules associated with the displayed document are stored in a configuration file for the displayed document.

5. The method of claim 4, wherein the stored configuration file for the displayed document comprises at least one of:

one or more default formatting rules for a document type associated with the displayed document, one or more formatting rules associated with a user identification (ID) of a user session associated with the NL query.

6. The method of claim 1, wherein the representation of the one or more formatting rules of the displayed document comprises:

a natural language description of the one or more formatting rules of the displayed document, or a first tokenized representation of the one or more formatting rules of the displayed document, the first tokenized representation generated using a tokenizing algorithm associated with the LLM.

7. The method of claim 6, wherein the first tokenized representation of the one or more formatting rules of the displayed document comprises one or more previously stored tokens.

8. The method of claim 6, wherein the representation of at least a portion of the NL query comprises a second tokenized representation of the portion of the NL query.

9. The method of claim 1, further comprising, prior to providing the augmented query to the LLM:

providing a preview of the augmented query to a user session associated with the NL query, and receiving an updated augmented query from the user session.

10. The method of claim 1, wherein at least one of the NL query, the augmented query, or the synthetic content generated by the LLM is encrypted.

11. The method of claim 1, wherein the displayed document is provided via a cloud-based word processing application.

12. A system comprising:

a memory device, and a processing device communicatively coupled to the memory device, the processing device to:

receive a natural language (NL) query for a synthetic content for a document displayed in a user interface of a word processing application, the document associated with metadata identifying formatting rules associated with the displayed document;

process the NL query to identify one or more formatting rules pertinent to the NL query;

access the metadata to select, from the formatting rules associated with the displayed document, the one or more formatting rules pertinent to the NL query;

generate an augmented query that comprises:

a representation of at least a portion of the NL query, and a representation of the one or more selected formatting rules;

provide the augmented query to a large language model (LLM); and update the displayed document with the synthetic content generated by the LLM in response to the augmented query.

13. The system of claim 12, wherein the NL query for the synthetic content comprises a seed content, and wherein the NL query comprises a request to auto-complete at least a portion of the displayed document.

14. The system of claim 12, wherein the one or more formatting rules of the displayed document comprise one or more of:

an indentation rule, a line spacing rule, a text alignment rule, a graphics placement rule, or a table placement rule.

15. The system of claim 12, wherein the formatting rules associated with the displayed document are stored in a configuration file for the displayed document.

16. The system of claim 15, wherein the stored configuration file for the displayed document comprises at least one of:

one or more default formatting rules for a document type associated with the displayed document, one or more formatting rules associated with a user identification (ID) of a user session associated with the NL query.

17. The system of claim 12, wherein the representation of the one or more formatting rules of the displayed document comprises:

a first tokenized representation of the one or more formatting rules of the displayed document, the first tokenized representation generated using a tokenizing algorithm associated with the LLM, and a second tokenized representation of the portion of the NL query.

18. The system of claim 12, wherein, prior to providing the augmented query to the LLM, the processing device is to:

provide a preview of the augmented query to a user session associated with the NL query, and receive an updated augmented query from the user session.

19. The system of claim 12, wherein at least one of the NL query, the augmented query, or the synthetic content generated by the LLM is encrypted.

20. A non-transitory computer-readable storage medium storing instructions that, when executed by a processing device, cause the processing device to:

receive a natural language (NL) query for a synthetic content for a document displayed in a user interface of a word processing application, the document associated with metadata identifying formatting rules associated with the displayed document;

process the NL query to identify one or more formatting rules pertinent to the NL query;

access the metadata to select, from the formatting rules associated with the displayed document, the one or more formatting rules pertinent to the NL query;

generate an augmented query that comprises:

a representation of at least a portion of the NL query, and a representation of the one or more selected formatting rules;

provide the augmented query to a large language model (LLM); and update the displayed document with the synthetic content generated by the LLM in response to the augmented query.

* * * * *